United States Patent
Sumita et al.

(10) Patent No.: US 8,064,081 B2
(45) Date of Patent: Nov. 22, 2011

(54) PRINT SYSTEM AND PRINTING METHOD FOR TRANSMITTING PRINT DATA FROM A HOST DEVICE TO AN IMAGE FORMING APPARATUS BY RADIO COMMUNICATION AND PERFORMING PRINTING

(75) Inventors: Chisei Sumita, Tokyo (JP); Atsushi Shimazaki, Kanagawa-Ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1094 days.

(21) Appl. No.: 11/282,770

(22) Filed: Nov. 21, 2005

(65) Prior Publication Data

US 2006/0114499 A1 Jun. 1, 2006

(30) Foreign Application Priority Data

Nov. 26, 2004 (JP) ................................ 2004-342250
Dec. 15, 2004 (JP) ................................ 2004-363377

(51) Int. Cl.
*G06F 3/12* (2006.01)
(52) U.S. Cl. ............. 358/1.15; 358/1.13; 358/1.14; 709/227; 455/419; 455/420; 713/168
(58) Field of Classification Search ............ 358/1.13, 358/1.14; 455/419, 420; 709/227; 713/168
See application file for complete search history.

(56) References Cited

U.S. PATENT DOCUMENTS

| | | | |
|---|---|---|---|
| 6,147,765 A | 11/2000 | Yoneda | 358/1.15 |
| 6,246,696 B1 | 6/2001 | Yamaguchi et al. | 370/475 |
| 7,079,276 B2 | 7/2006 | Kimura | 358/1.15 |
| 7,324,462 B1* | 1/2008 | Page et al. | 370/255 |
| 2003/0017805 A1* | 1/2003 | Yeung et al. | 455/41 |
| 2003/0137954 A1* | 7/2003 | Yokoyama | 370/331 |
| 2004/0160623 A1* | 8/2004 | Strittmatter et al. | 358/1.15 |
| 2005/0012958 A1* | 1/2005 | Watanabe | 358/1.15 |
| 2006/0077410 A1* | 4/2006 | Liao et al. | 358/1.13 |
| 2007/0153323 A1* | 7/2007 | Shimazaki | 358/1.15 |

FOREIGN PATENT DOCUMENTS

| | | |
|---|---|---|
| JP | 08-044512 | 2/1996 |
| JP | 11-095941 | 4/1999 |
| JP | 2003-114772 | 4/2003 |
| JP | 2003-179607 | 6/2003 |
| JP | 2003-248567 | 9/2003 |
| JP | 2004-050726 | 2/2004 |

OTHER PUBLICATIONS

Bluetooth Printing Working Group, "Hardcopy Cable Replacement Profile Version 1.0a", Bluetooth, Sep. 23, 2002.*
Bluetooth Printing Working Group, "Hardcopy cable replacement profile version 1.0a." Bluetooth, Sep. 23, 2002, pp. 2-56.

(Continued)

*Primary Examiner* — Chan S Park
*Assistant Examiner* — Jacky X Zheng
(74) *Attorney, Agent, or Firm* — Fitzpatrick, Cella, Harper & Scinto

(57) ABSTRACT

A print system for transmitting print data from a host PC to a printer by radio communication and performing printing. It is determined on the host PC side whether or not two-way communication by radio communication is possible, and if two-way communication is possible, information indicating that two-way communication is possible is transmitted to the printer. On the printer side, identification information of the host PC which transmitted the information indicating that two-way communication is possible is registered.

5 Claims, 10 Drawing Sheets

OTHER PUBLICATIONS

Bluetooth Sig: "Bluetooth Core System Package [Controller Volume], Part B, Baseband Specification, version 1.2" Bluetooth, vol. 2, Nov. 5, 2003, pp. 45-188.

Bluetooth Imaging Working Group: "Basic imaging profile version 1.0 final-a" Bluetooth, Jul. 25, 2003, pp. 1-99.

* cited by examiner

PRINT SYSTEM AND PRINTING METHOD FOR TRANSMITTING PRINT DATA FROM A HOST DEVICE TO AN IMAGE FORMING APPARATUS BY RADIO COMMUNICATION AND PERFORMING PRINTING

This application claims priority under 35 U.S.C. §119 of Japanese Application No. 2004-342250, filed Nov. 26, 2004, and of Japanese Application No. 2004-363377, filed Dec. 15, 2004.

FIELD OF THE INVENTION

The present invention relates to a print system and a printing method for transmitting print data by radio communication.

BACKGROUND OF THE INVENTION

Conventionally, in a print system including a host computer (host PC) and a printer, the host PC and the printer are interconnected via a cable, and status information indicating various printer statuses including error information, residual ink amount, battery capacity and the like are relayed to the host PC (for example, Related Art 1: Japanese Patent Application Laid-Open No. 2004-050726).

In this print system, the host PC transmits a status information acquisition command to the printer, and the type of desired status information has been previously registered in the printer. When the status information of the registered type changes, it is updated, and the status information of the type registered by the host PC is read by polling. Further, in recent years, proposed is a print system where all the status information can be arbitrarily transmitted from the printer side to the host PC without transmission of a status information acquisition command.

Today, as one radio data communication system, Bluetooth communication adopting spread spectrum communication in a frequency band of 2.4 GHz is utilized.

In Bluetooth communication, the profiles are determined in correspondence with the respective use cases, and communication control is performed in accordance with each profile. In Hardcopy Cable Replacement Profile (hereinbelow, "HCRP") as one of the profiles, the method related to communication between a host PC and a printer or scanner is defined in detail. In the HCRP profile, communication is performed through the Logical Link Control and Adaptation Protocol (hereinbelow, "L2CAP") layer of the Bluetooth communication. A unique 48-bit Bluetooth device address (hereinbelow, "BD_ADDR") is allocated to a Bluetooth communication device, and upon connection, the BD_ADDR is notified for link connection.

In the HCRP profile, two channels are provided in the L2CAP layer. The host PC transmits communication data on a data channel, and performs various controls on a control channel. In the print system, upon data flow control on the data channel, for example, the number of data bytes receivable by its device (printer) on the control channel is provided as credit to the communication opposite-end device (host PC). The communication opposite-end device transmits communication data through the data channel within a range of the given credit. Further, on the control channel, the device ID of the printer can be received.

Next, a method for acquisition of status information between the host PC and the printer will be described. Note that when the printer and the host PC are interconnected by the HCRP, to display the current status of the printer on the host PC side, the status information can be transmitted from the printer through the data channel. However, there is a device which cannot normally receive printer status information in accordance with specification of protocol stack software.

A printer driver installed in the host PC side determines whether or not the printer status information can be received with the utilized protocol stack. If the printer driver determines that the printer status information can be received, the printer driver transmits a status information command through the data channel to the printer to register desired status information on the printer side. On the other hand, the printer side checks its current status in accordance with the received status information command, and transmits the status including error information, residual ink amount, battery capacity and the like in a predetermined format, based on the registered status information, on the data channel. To notify a user of the printer status, the host PC side displays information on a monitor or the like accompanying the host PC based on the received status information.

Further, when the printer driver determines that the printer status information cannot be received with the protocol stack utilized in the host PC, the printer driver does not transmit the status information command to receive the printer status information.

Note that in a case where data communication is performed using the Bluetooth communication, to prevent occupation of radio communication band, or to prevent electric current consumption, otherwise, due to the specification problem of limitation of simultaneous connection i.e. up to seven devices to one master, link connection and disconnection are performed by one data transmission. In an HCRP print system, link connection and disconnection are performed for one print job. As the status information acquisition command is a sort of print job, upon each transmission of status information acquisition command from the host PC, link connection and disconnection are performed unless the link is already established during printing or the like.

As described above, as some devices cannot perform two-way communication in accordance with a connection opposite-end host PC, when status information is transmitted without discretion from a printer side to such device incapable of two-way communication, a trouble may occur on the communication opposite-end device.

Accordingly, a host PC capable of two-way communication transmits the status information command upon each link connection and performs two-way communication. To always check the printer status and release the printer to be utilized by other devices, it is necessary to prepare a process to establish link connection at predetermined periods, transmit the status information command during the link connection, and receive the status information data.

Further, when the Bluetooth communication is used, as link connection and disconnection are performed by each print job, the printer clears the status type registered upon connection. Accordingly, the host PC transmits the status information acquisition command upon each connection with the printer to obtain the printer status information. For example, even when the host PC monitors the printer status without performing print processing, the host PC transmits the status information acquisition command.

In a printer having plural interfaces in which an interface occupation status is changed in accordance with data communication from a host PC, in a case where data communication from the host PC is performed upon each connection, the interface occupation status is inconveniently temporarily changed.

Further, as in the case of recent cable-connection print systems, the arbitrary transmission of all the status information from the printer side to the host PC without status information acquisition command may be applied to the Bluetooth communication. In this case, it is necessary to operate a driver which always normally receives status information in the host PC. However, the printer is not always connected to such host PC. When application software or driver, which cannot receive status information, operates in a host PC, the host PC transmits data that the printer cannot interpret, and a trouble may occur in the host PC.

SUMMARY OF THE INVENTION

The present invention has been made in consideration of the above situation, and has its object to improve convenience in communication between a host device and an image forming apparatus.

Further, another object of the present invention is to perform processing with reduced redundancy in communication between the host device and the image forming apparatus, thereby improving the convenience of the communication.

To attain the above objects, according to an aspect of the present invention, provided is a print system for transmitting print data from a host device to an image forming apparatus by radio communication and performing printing, wherein the host device comprising: determination means for determining whether or not two-way communication by radio communication is possible; and transmission means for, if the two-way communication is possible, transmitting information indicating that the two-way communication is possible to the image forming apparatus, and wherein the image forming apparatus comprising: registration means for registering identification information of the host device which transmitted the information indicating that the two-way communication is possible.

Further, according to another aspect of the present invention, provided is an image forming apparatus to be connected to a host device by using Bluetooth communication, comprising: reception means for, when the image forming apparatus is connected to a host device by a predetermined Bluetooth connection profile, receiving information indicating that the host device can receive status information of the image forming apparatus; registration means for registering the host device which transmitted the information; and first transmission means for, when the image forming apparatus is connected to the host device registered in the registration means by the predetermined connection profile, automatically transmitting the status information.

Further, according to another aspect of the present invention, provided is a host device to be connected to an image forming apparatus by using Bluetooth communication, comprising: connection means for connecting the host device to an image forming apparatus by a predetermined Bluetooth connection profile; determination means for determining based on information from the image forming apparatus connected by the connection means whether or not the host device is registered in the image forming apparatus; and transmission means for transmitting information for registration of the host device as a host device which can obtain status information of the image forming apparatus in the image forming apparatus, in correspondence with determination by the determination means.

Further, according to another aspect of the present invention, provided is an image forming apparatus comprising: registration means for registering a host device which can obtain status information of the image forming apparatus; determination means for determining whether or not a host device connected to the image forming apparatus is registered in the registration means; and notification means for notifying the host device of the status information of the image forming apparatus in correspondence with determination by the determination means.

Further, according to another aspect of the present invention, provided is a host device to be connected to an image forming apparatus, comprising: determination means for determining whether or not the host device is registered in the image forming apparatus; and transmission means for transmitting information for registration of the host device as a host device which can obtain status information in the image forming apparatus, in correspondence with determination by the determination means.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Hereinbelow, preferred embodiments of the present invention will now be described in detail in accordance with the accompanying drawings. In the embodiments, the Bluetooth technology is applied to a radio communication system for close range communication between devices such as an image forming apparatus and a host device. Further, data communication using the Bluetooth technology in a print system having a host device (personal computer) and an image forming apparatus (printer) will be described.

First Embodiment

Figure 1:
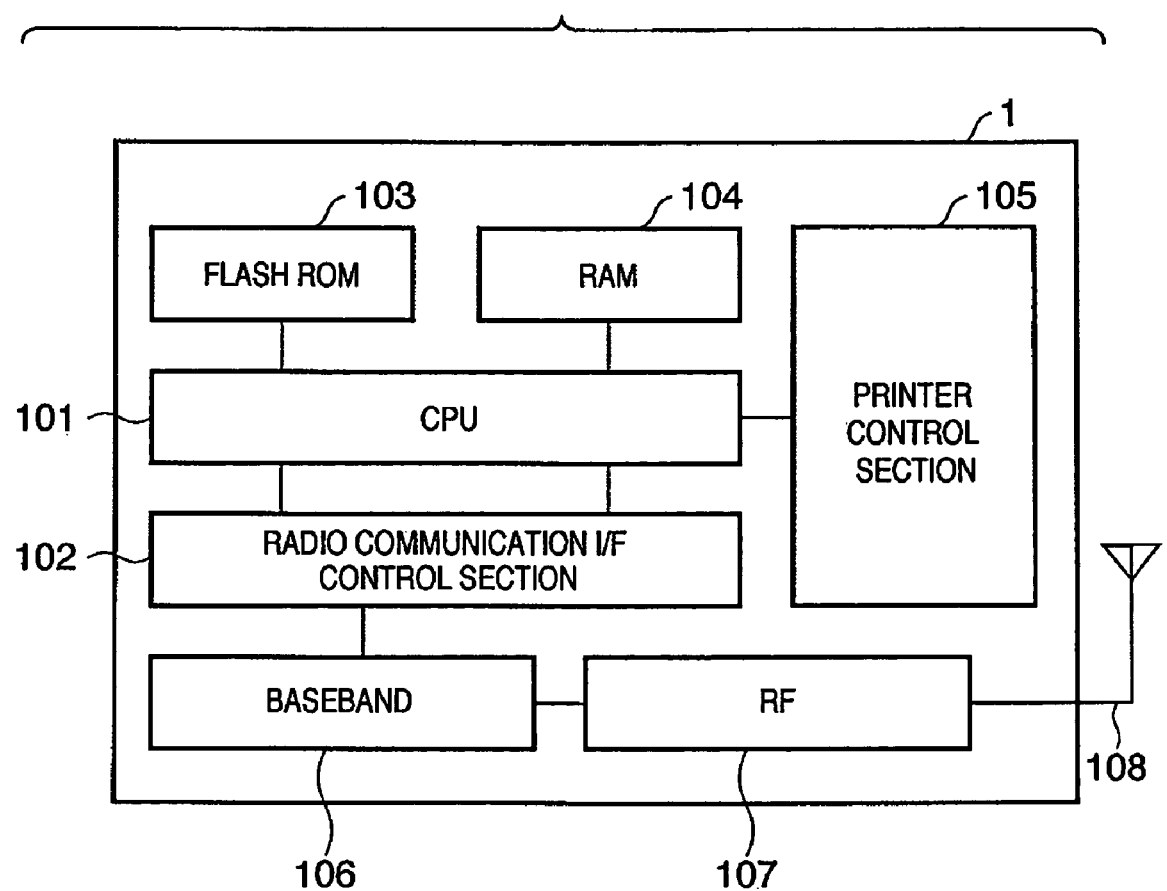
FIG. 1 is a block diagram showing an example of the construction of a print system according to a first embodiment of the present invention.
Figure 1:
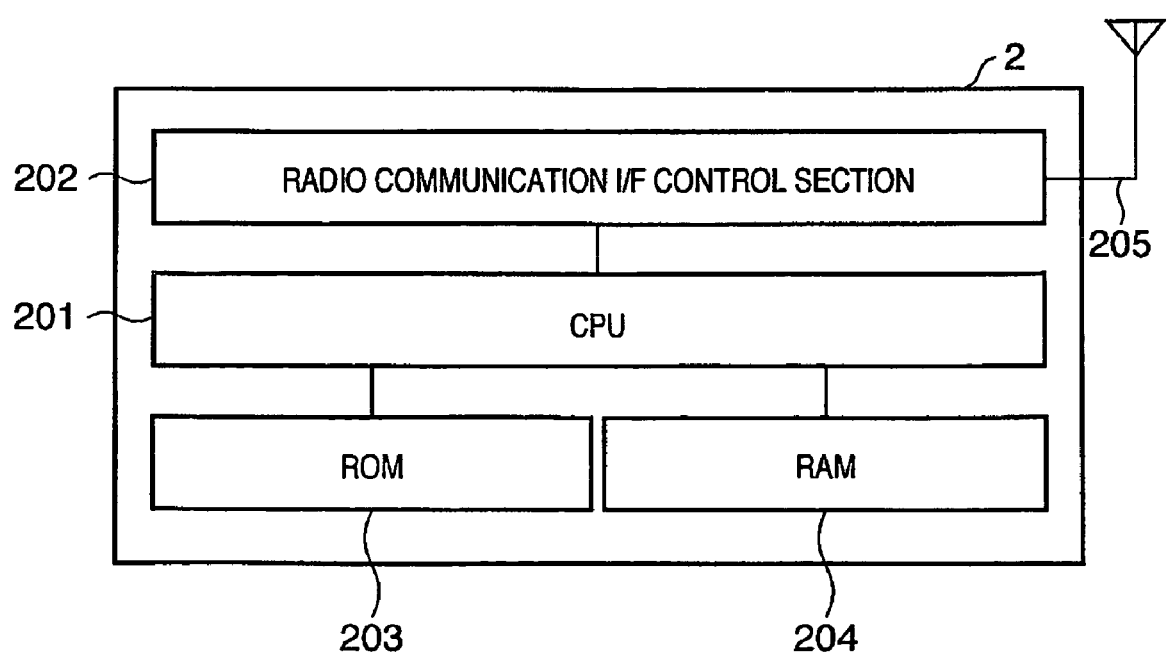

FIG. 1 is a block diagram showing an example of the construction of a print system according to a first embodiment of the present invention. As shown in FIG. 1, the print system has a printer 1 and at least one host PC 2. The printer 1 has a printer control section 105, a CPU 101, a flash ROM 103, a RAM 104, a radio communication I/F control section 102, a baseband section 106, an RF section 107 and an antenna 108.

The flash ROM 103 holds programs to control the printer 1, various operation tables and the like. Note that the objects of the present invention can be attained by simultaneously using nonvolatile memories such as ROMs and EEPROMs without the flash ROM 103. The RAM 104 holds various variables, control tables, data for temporary use, transmission and reception buffers for packet reception and the like. The CPU 101 performs processing to be described later in accordance with the programs stored in the flash ROM 103.

Programs described in the flowcharts of FIGS. 2, 3, 6, and 7 are stored in Flash ROM 103 and they are executed by CPU 101.

A signal received through the antenna 108 is subjected to demodulation processing by the RF section 107, and outputted to the baseband section 106. In the baseband section 106, error correction processing is performed on the demodulated data, and in correspondence with the processing result, normally-received data is outputted to the radio communication I/F control section 102. Regarding error-detected data, a retransmission request is transmitted to the communication opposite-end device. Further, an authentication request is transmitted to the communication opposite-end device and encryption processing is performed in accordance with setting of a security mode. Various controls between the baseband section 106 and the radio communication I/F control section 102, event processing and data communication are performed in packet units in accordance with a standardized host controller interface (hereinbelow, "HCI").

Upon data transmission, transmission data in the HCI packet form is transferred from the radio communication I/F control section 102 to the baseband section 106, and an error correction code and the like are added to the transmission data. Then the data is converted into predetermined format data, and outputted to the RF section 107. In the RF section 107, the input data is modulated, and transmitted to the other radio communication device by the antenna.

Upon data reception, data is transferred in a reverse route to that of transmission, and finally, HIC packet data, inputted from the baseband section 106 into the radio communication I/F control section 102, is analyzed. The radio communication I/F control section 102 performs various control processings necessary for communication such as a link connection negotiation, service search response, connection negotiations in the respective protocol layers, data transfer and flow control.

Note that the printer 1 is capable of two-way communication for receiving print data on the data channel and transmitting its status information to the host PC 2 upon HCRP connection. Further, on the control channel, the printer 1 responds with its device ID as prescribed in the HCRP protocol.

As in the case of the printer 1, the host PC 2 as the connection opposite-end side has a CPU 201, a radio communication I/F control section 202, a ROM 203, a RAM 204 and an antenna 205. The host PC 2 is connected with the printer 1 by radio communication through the radio communication I/F control section 202 and performs transmission/reception of various print data and control data, and transmits print data to perform printing.

Further, as the host PC 2 has a display device (not shown), the host PC 2 analyzes status information data received from the printer 1 and presents the status of the printer 1 to the user.

Further, the host PC 2 has a printer driver to be described later in the RAM 204 or ROM 203 or a hard disk (not shown).

Figure 4:
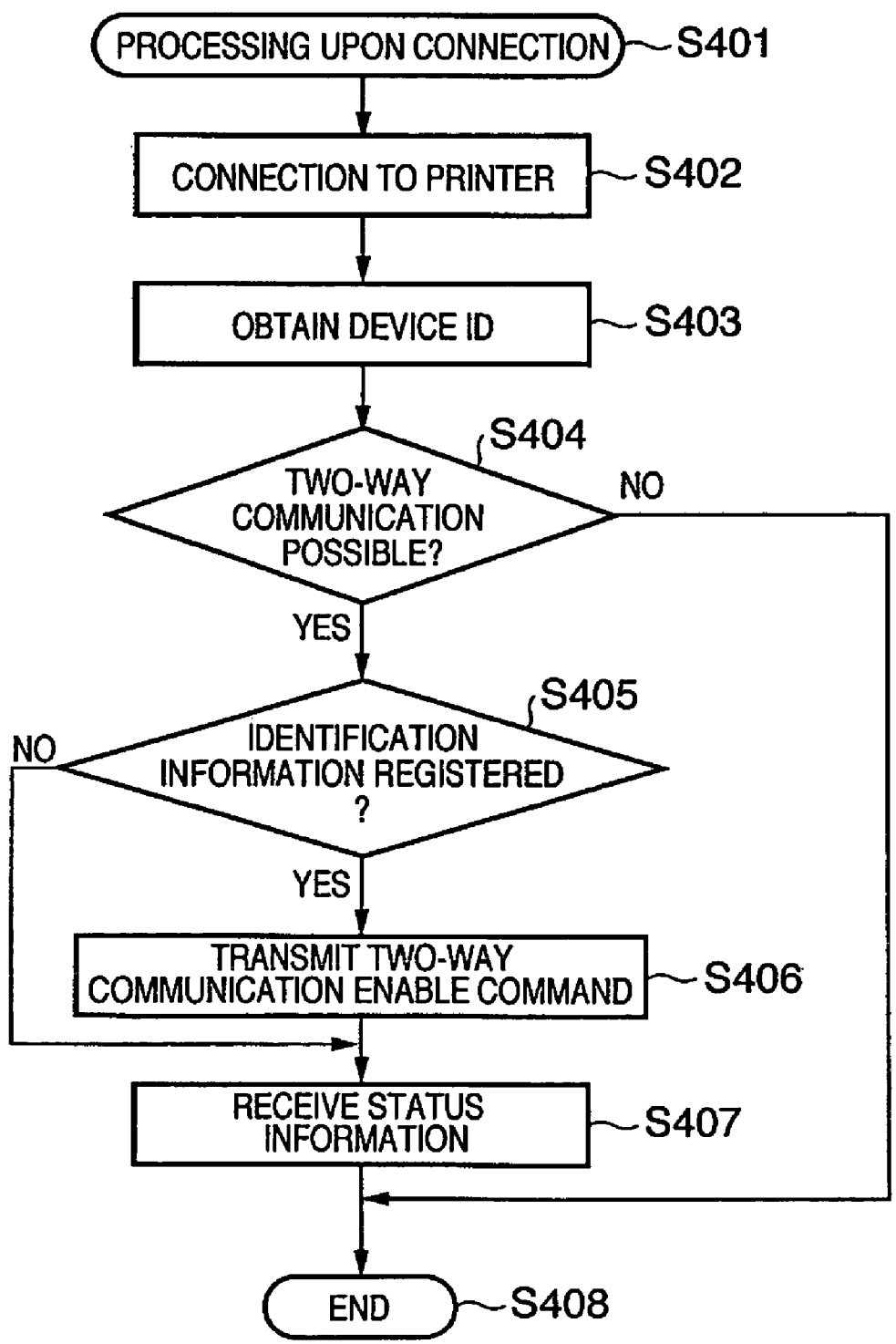
FIG. 4 is a flowchart showing processing by a printer driver installed in the host PC 2.
Figure 9:
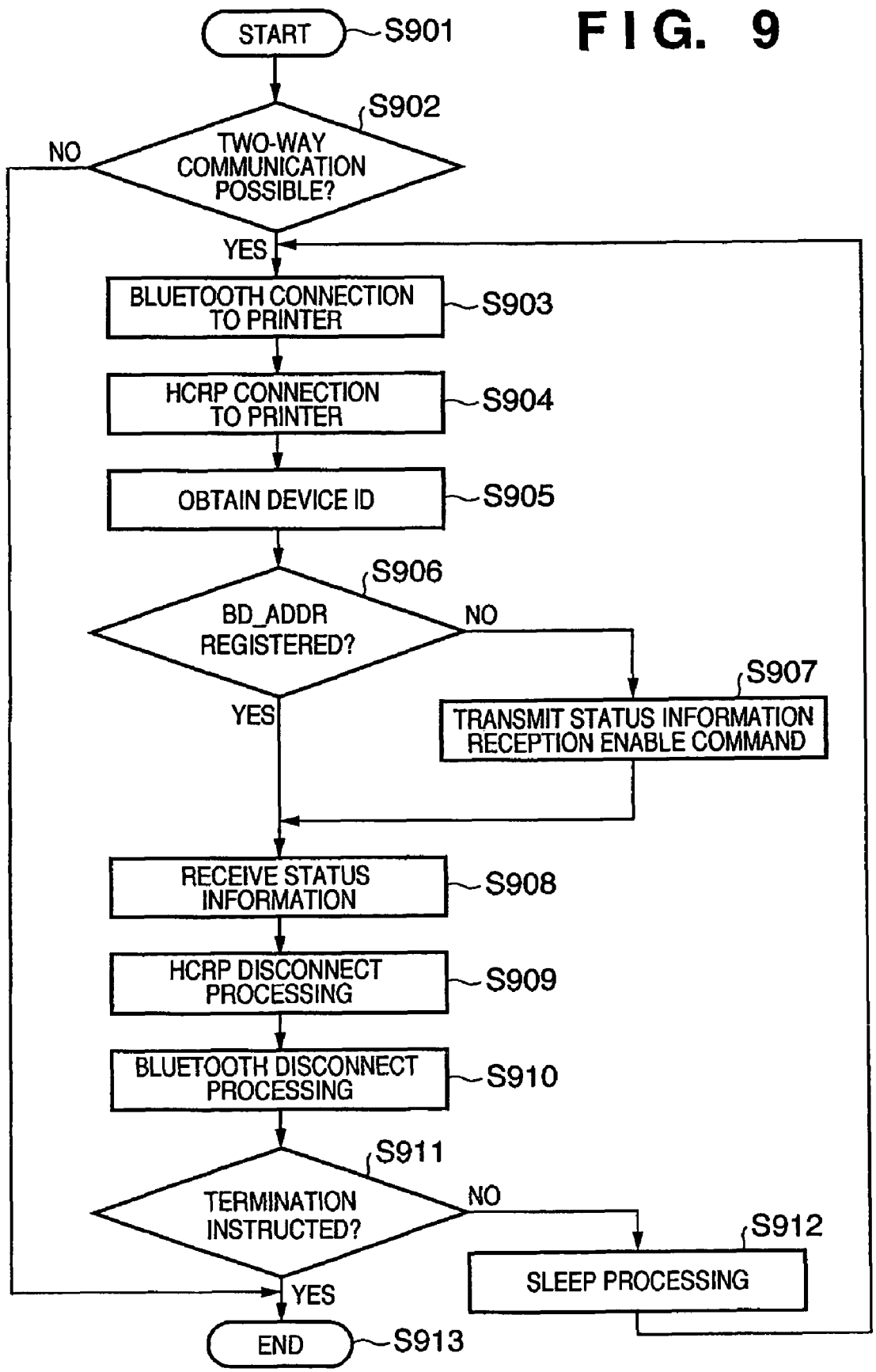
FIG. 9 is a flowchart showing the flow of processing in a status monitor application included in the printer driver.

Programs described in the flowcharts of FIGS. 4 and 9 are stored in RAM 204 or ROM 203 or the hard disk and they are executed by CPU 201.

In the construction above, the operation of the printer 1 upon acceptance of HCRP connection from the PC 2 will be described in detail with reference to the flowchart of FIG. 2.

Figure 2:
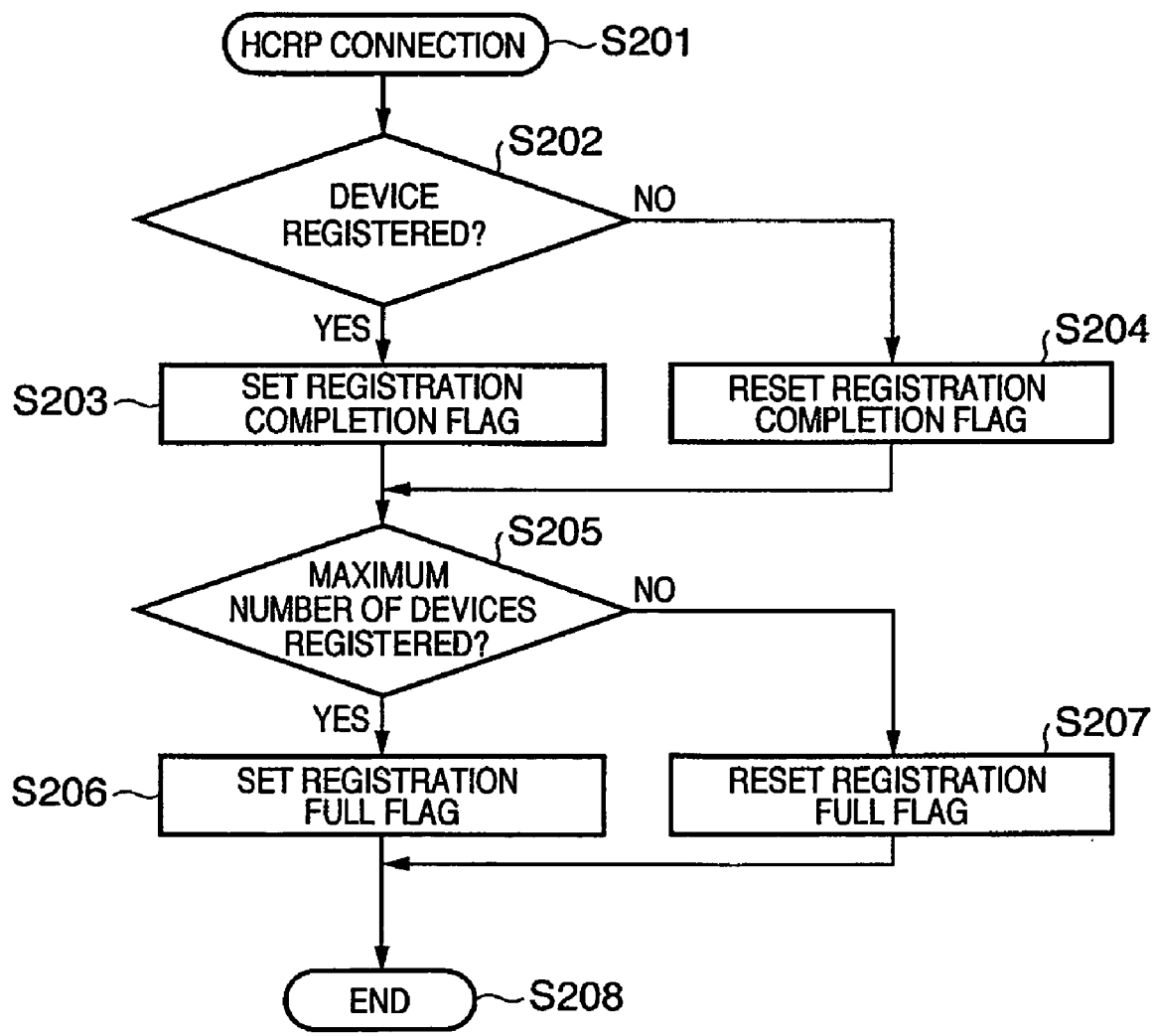
FIG. 2 is a flowchart showing processing when a printer 1 has accepted HCRP connection from a host PC 2.

FIG. 2 is a flowchart showing processing when the printer 1 has accepted HCRP connection from the host PC 2. This processing is performed to update setting of a registration completion flag based on a return value of a device ID and setting of a registration full flag set when the number of registered devices reaches the maximum number.

Note that in the printer 1, identification information such as BD_ADDR address of HCRP two-way communicable devices are stored in a nonvolatile memory or the RAM.

When the HCRP connection is performed from the host PC 2 with respect to the printer 1 (S201), the CPU 101 of the printer 1 determines whether or not the device is registered based on identification information of the radio device connected to the printer 1 (S202). If the device is registered, the registration completion flag is set (S203). If the device is not registered, the registration completion flag is reset (S204).

Next, it is checked based on a list of BD_ADDR addresses whether or not the number of registered host PCs in the printer 1 has reached the maximum number (S205). If the number of registered host PCs has reached the maximum number, the registration full flag is set (S206). If the number of registered host PCs has not reached the maximum number, the registration full flag is reset (S207). In this manner, the partial information of the device ID (the registration completion flag and the registration full flag) is updated upon HCRP connection in preparation for a future device ID request from the host PC 2.

Note that when a device ID request has been transmitted from the host PC through the HCRP control channel, a device ID value including a device name, a maker name and the like as well as the set registration information is returned.

Next, registration of two-way communicable host PC in the printer 1 will be described in detail with reference to the flowchart of FIG. 3.

Figure 3:
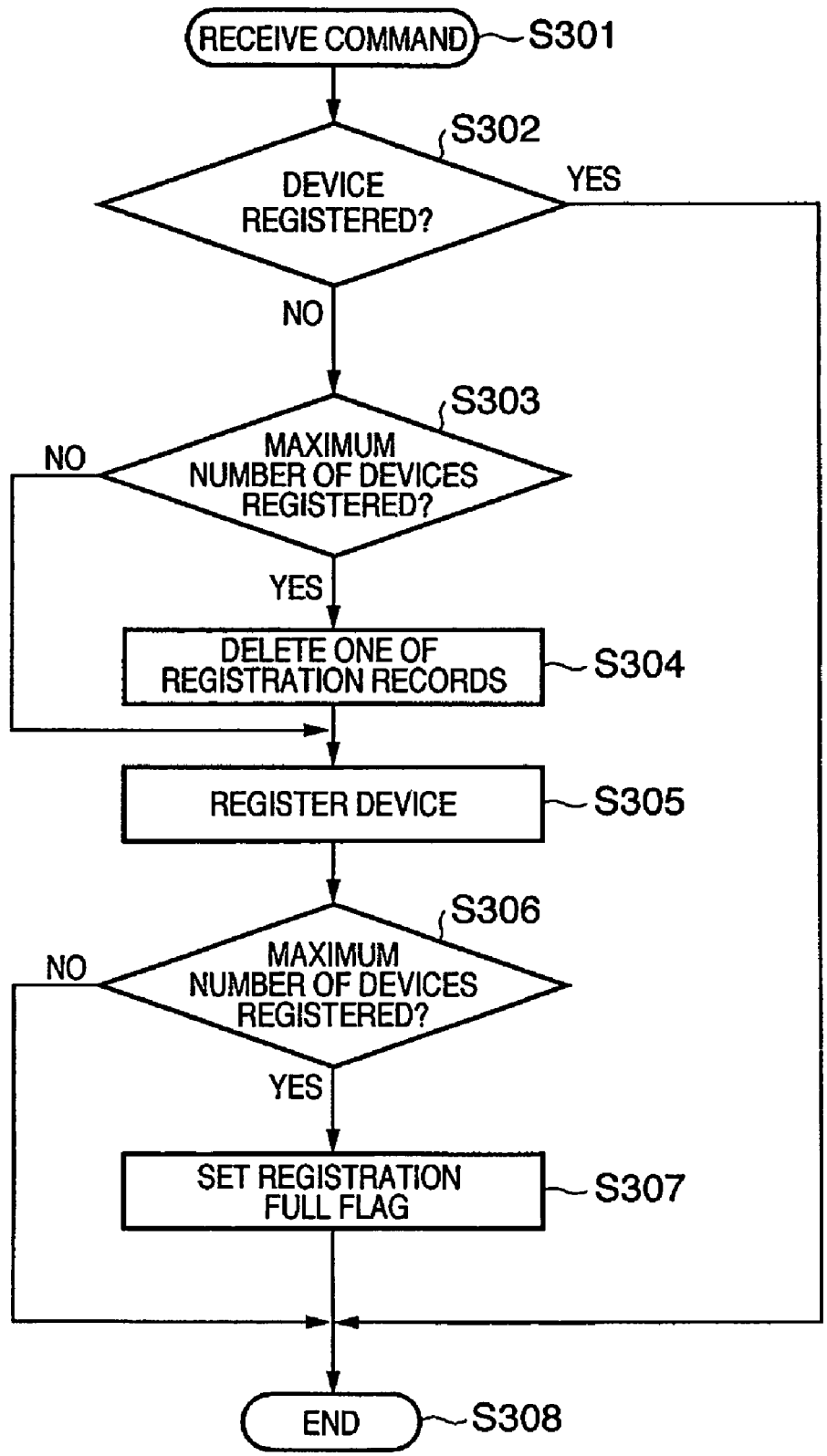
FIG. 3 is a flowchart showing processing when a two-way communication enable command has been transmitted from the host PC 2 during the HCRP connection.

FIG. 3 is a flowchart showing processing when a two-way communication enable command has been transmitted from the host PC 2 during the HCRP connection. When the command has been received (S301), it is determined in the printer 1 whether or not the identification information of the host PC has already been registered (S302). If the identification information has been registered, it is checked whether or not the entire recording area of the printer 1 is full and the number of registered devices has reached the maximum number (S303). When the number of registered devices has reached the maximum number, one of the registered records is deleted so as to ensure a recording area (S304).

Note that the deletion may be performed starting with the oldest record, or from the lowest priority record in accordance with priority order based on connection frequency or the like.

In this manner, the registration area is ensured, and the identification information of unregistered device is registered (S305). Thereafter, it is determined whether or not the number of registered devices has reached the maximum number (S306), and when the number of registered devices has reached the maximum number, the registration full flag is updated (S307), and the process ends (S308). As described above, when the two-way communication enable command has been received from the host PC 2, the identification information of the device is registered in the printer 1.

Next, the construction of the printer driver in the host PC 2 will be described. The printer driver is software which operates as an application on the host PC 2. The printer driver transmits print data interpretable for the printer 1. Further, the printer driver analyzes the status information received from the printer 1, and displays the result of analysis on the display device of the host PC 2. Further, the printer driver determines whether or not the host PC 2 can perform two-way communication based on print port information of the host PC 2, the installed protocol stack information and the like.

Next, the processing by the printer driver installed in the host PC 2 will be described in detail with reference to the flowchart of FIG. 4. The printer driver is started by print processing or printer status checking processing by the user, and performs processing with respect to the printer 1 upon connection (S401). First, the printer driver establishes connection with the printer 1 by the procedures of link connection and the HCRP connection (S402). Next, the printer driver issues a device ID request to the printer 1 on the HCRP control channel, and obtains a device ID (S403).

Next, the printer driver checks whether or not two-way communication is possible by an application for Bluetooth communication installed in the host PC 2 (S404). If two-way communication is impossible, the process ends without any processing (S408). When two-way communication is possible, the registration completion flag is checked from the already obtained device ID information to determine whether or not the host PC 2 has been already registered in the printer 1 (S405). When the host PC 2 has not been registered, the two-way communication enable command is transmitted to the printer 1 (S406). Thereafter, the status information transmitted from the printer 1 is received (S407), and the process ends (S408). When the status information has been received, the information is analyzed and the status of the printer 1 is displayed on the display device of the host PC 2 for notifying the user of the printer status.

Figure 5:
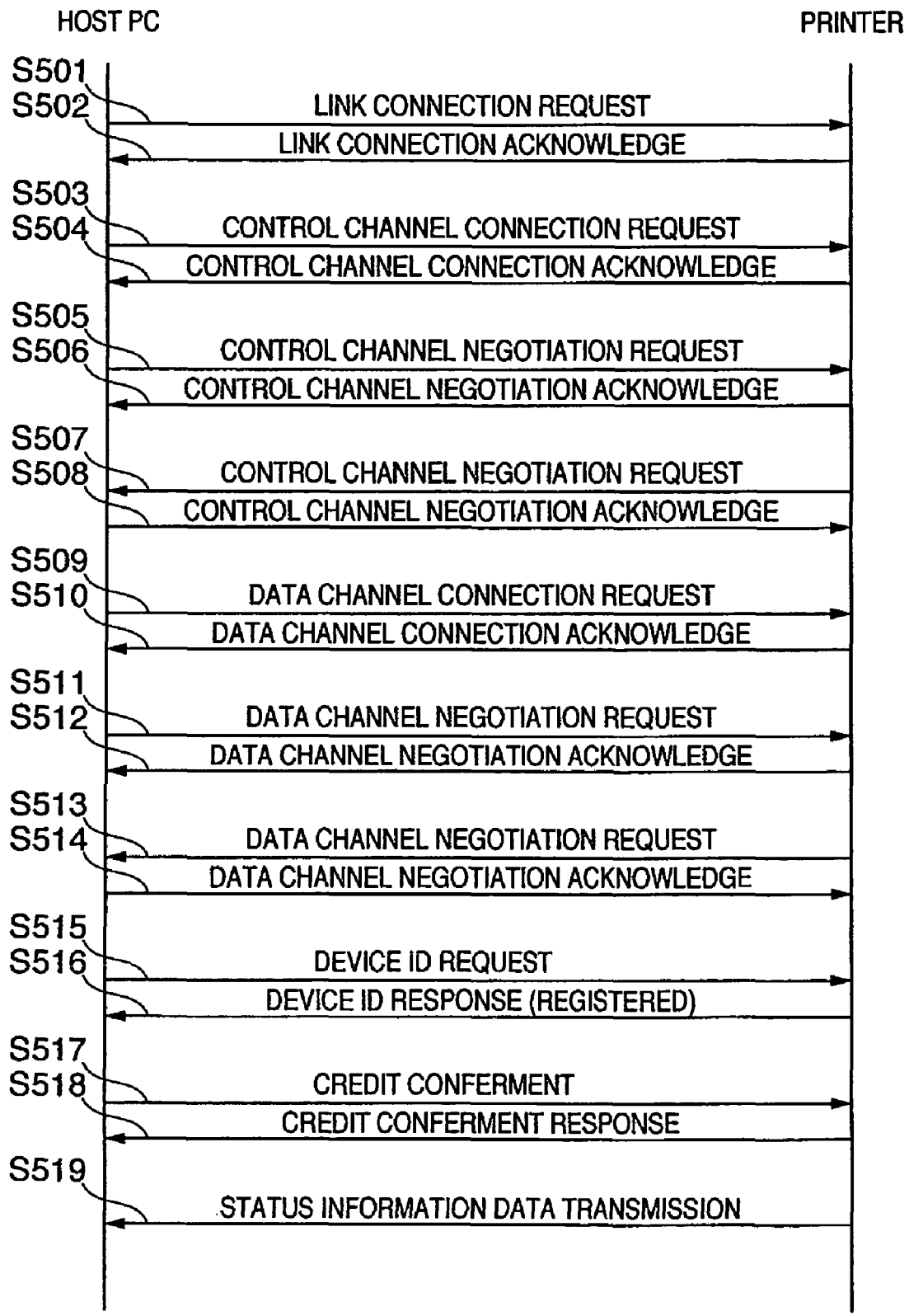
FIG. 5 illustrates a communication sequence between the printer 1 and the registered host PC 2.

Next, the flow of communication between the printer 1 and the registered host PC 2 will be described in detail with reference to the sequence of FIG. 5.

When a print command has been issued from the host PC 2 by the user's operation or the like, the host PC 2 transmits a link connection request to the printer 1 (S501). In response to the link connection request, the printer 1 returns an acknowledge (S502), thereby establishing a link connection. Next, a HCRP control channel connection request is transmitted in the L2CAP layer (S503), then the printer 1 side returns an acknowledge (S504), thereby control channel connection is established.

In the L2CAP layer, as negotiations between both sides are required in the respective connections, negotiations are made regarding parameters transferred on the control channel. First, the host PC 2 side requests negotiation of the control channel (S505), then the printer 1 side returns an acknowledge (S506), thereby the negotiation on the host PC 2 side is completed. Similarly, the printer 1 side transmits a negotiation request for negotiating its parameters (S507), then receives an acknowledge (S508), thereby completing the negotiation.

Next, as in the case of the control channel, connection request and negotiation request regarding the data channel are transmitted (S509 to S514), and the negotiation of parameters on the data channel is completed.

Next, the host PC 2 transmits a device ID request to the printer 1 utilizing the control channel (S515). In response to the request, the printer 1 transmits its device ID where the registration completion flag indicating that the host PC is registered in the device ID is set (S516). When the host PC has not been registered, the host PC 2 transmits the two-way communication enable command through the data channel, thereby performing registration in accordance with the procedure in FIG. 3. In this manner, when the host PC has not been registered, data communication on the data channel from the host PC 2 to the printer 1 occurs.

The host PC 2 checks that the device is registered in the printer 1 as a two-way communicable device, and provides a credit where the number of bytes corresponds to its receivable value to the printer 1 (S517). Then the printer 1 returns an acknowledge (S518), thereby giving the credit to the printer 1. The printer 1 transmits the current status as the status information data through the data channel (S519). The host PC 2 analyzes the received status information data, and displays the status of the printer 1.

Accordingly, in a case where the status of the printer 1 is always detected in the host PC 2, once the host PC 2 has been registered in the printer 1, the status of the printer 1 can be detected without data communication through the data channel from the host PC 2 side.

According to the first embodiment, the frequency of data transmission can be reduced by registering a radio device capable of two-way communication in a printer.

Second Embodiment

Next, a second embodiment of the present invention will be described in detail with reference to the drawings.

As the print system has the same construction as that in FIG. 1 used in the first embodiment, the description of the construction according to the second embodiment will be omitted.

Hereinbelow, the operation of the printer 1 upon acceptance of the Bluetooth connection from the host PC 2 will be described with reference to the flowchart of FIG. 6. The processing is performed by the CPU 101 of the printer 1 in accordance with the program stored in the flash ROM 103 or the RAM 104. Further, the processing relates to setting of the registration completion flag set in the device ID and setting of the registration full flag set when the number of devices registered in the printer 1 has reached the maximum number.

Figure 6:
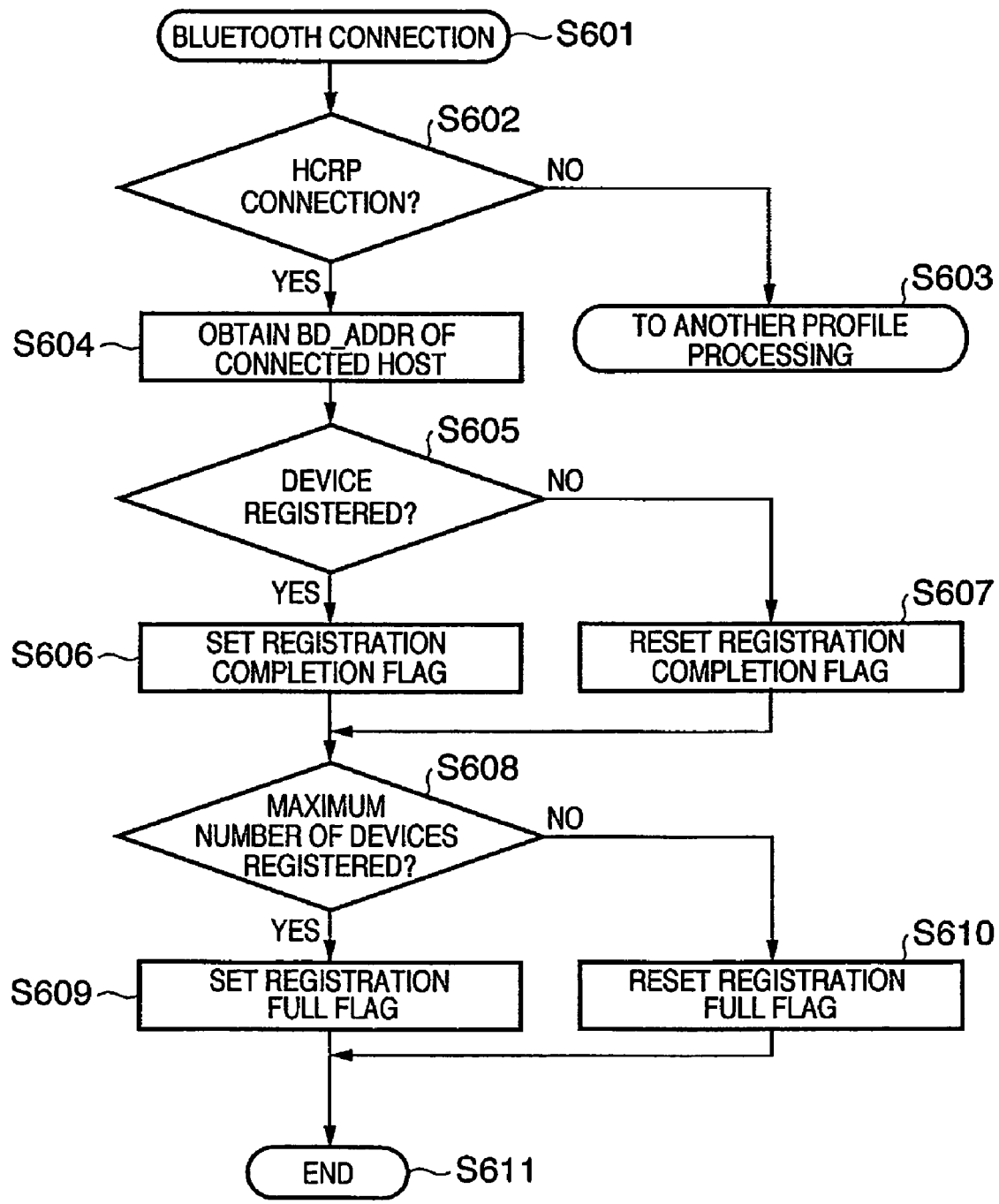
FIG. 6 is a flowchart showing processing upon Bluetooth connection in the printer 1 according to a second embodiment of the present invention.

FIG. 6 is a flowchart showing processing upon Bluetooth connection in the printer 1 according to the second embodiment. When the Bluetooth connection is performed from the host PC 2 with respect to the printer 1 (S601), the CPU 101 checks whether or not the HCRP connection has been performed (S602). In the case of connection by another profile, processing corresponding to the profile is performed (S603). When the HCRP connection has been performed, the BD_ADDR of the host PC 2 is obtained by the Bluetooth technology from information upon connection (S604). In the printer 1, a list of BD_ADDR addresses of host PCs capable of HCRP two-way communication which receive status information has been previously stored in its nonvolatile memory or the RAM 104 by processing to be described later.

The CPU 101 determines whether or not the obtained BD_ADDR address is registered in the list (S605), and if the BD_ADDR address is registered, sets the registration completion flag (S606) while if the BD_ADDR address is not registered, the CPU 101 resets the registration completion flag (S607). Next, the CPU 101 checks whether or not the number of registered devices has reached the maximum number registrable in the BD_ADDR list (S608), and when the number of registered device has reached the maximum number, sets the registration full flag (S609), while when the number of registered devices has not reached the maximum number, resets the registration full flag (S610). In this manner, the partial information of the device ID (the registration completion flag and the registration full flag) is updated upon HCRP connection in preparation for a future device ID request from the host PC 2.

Next, the registration of a host PC which is capable of two-way communication and which accepts the status information will be described in detail with reference to the flowchart of FIG. 7. The processing is performed by the CPU 101 of the printer 1 in accordance with the program stored in the flash ROM 103 or the RAM 104.

Figure 7:
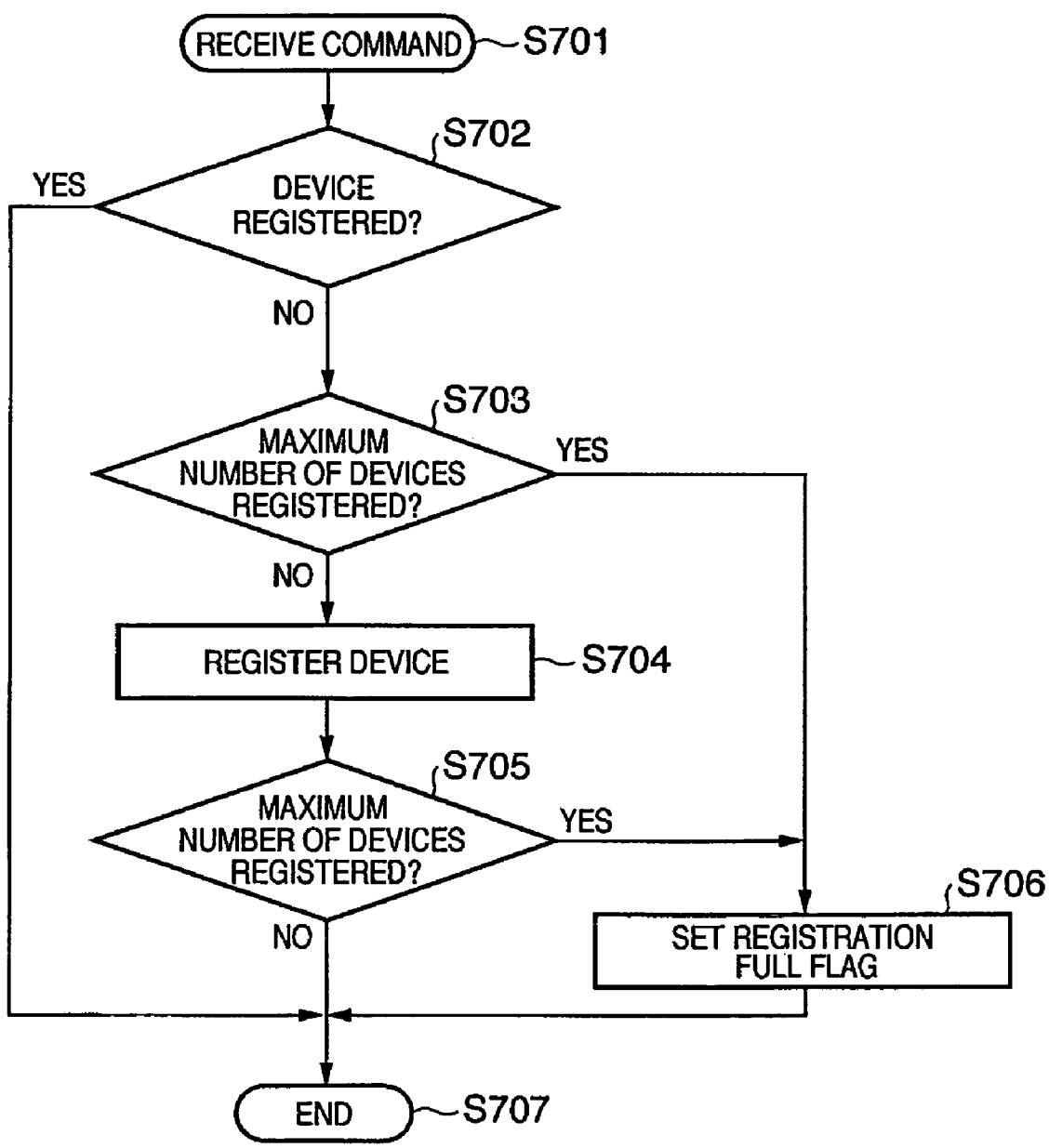
FIG. 7 is a flowchart showing command reception processing in the printer 1 according to the second embodiment.

FIG. 7 is a flowchart showing processing indicating command reception processing in the printer 1 according to the second embodiment. The processing is performed by the CPU 101 of the printer 1 upon reception of "status information reception enable command" from the host PC 2 during the HCRP connection.

When the printer 1 has received the status information reception enable command (S701), the CPU 101 checks whether or not the BD_ADDR address of the host PC 2 obtained upon the HCRP connection at step S604 has been already registered in the list stored in the RAM 104 (S702). When the address has already been registered in the list, the process ends (S707). When the address has not been registered in the list, the CPU 101 checks whether or not the number of host PCs registered in the printer 1 has reached the maximum number (S703). When the number of host PCs has reached the maximum number, the CPU 101 sets the registration full flag (S706), and the process ends (S707).

When the number of host PCs has not reached the maximum number, the CPU 101 registers the BD_ADDR address of the connected host PC 2 in the list (S704). Thereafter, the CPU 101 checks whether or not the number of host PCs has reached the maximum number (S705). When the number of host PCs has reached the maximum number, the CPU 101 sets the registration full flag (S706), and the process ends (S707).

As described above, the BD_ADDR address of the host PC 2 is registered in the RAM 104 of the printer 1, when the "status information reception enable command" has been received from the host PC 2.

Note that in the flowchart of FIG. 7, the registered device is not automatically changed but the current status as whether or not the registration is possible is indicated with the registration full flag. However, when the number of registered devices has reached the maximum number, one of the registered records may be deleted so as to ensure a registration area for the host PC in the RAM 104 and register the address of the host PC. In this case, the deletion may be performed from the oldest record, or from the lowest priority record in accordance with priority order based on connection frequency or the like.

Figure 8:
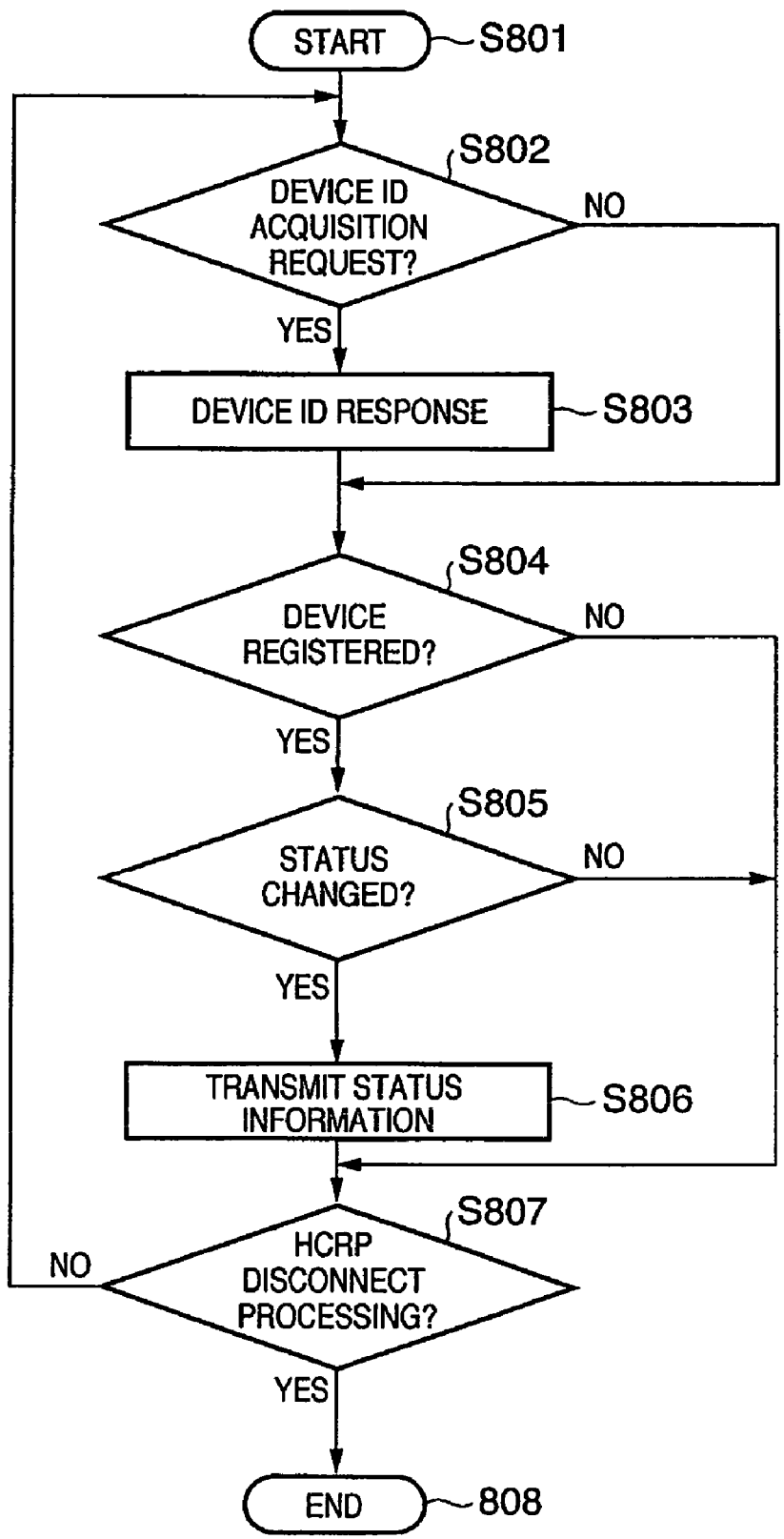
FIG. 8 is a flowchart showing device ID response processing and status information transmission processing in the HCRP connection.

Next, device ID response processing and status information transmission processing during the HCRP connection will be described in detail with reference to the flowchart of FIG. 8. The processing is performed by the CPU 101 of the printer 1 in accordance with the program stored in the flash ROM 103 or the RAM 104.

When the host PC 2 transmits a device ID request to the printer 1 on the control channel as prescribed in the HCRP protocol, the CPU 101 of the printer 1 detects the request (S802). Then the CPU 101 combines a predetermined ID of the printer with the registration completion flag and the registration full flag set by the processings shown in the flowcharts of FIGS. 6 and 7, and transmits the combined information as a device ID to the host PC 2 (S803).

Next, the CPU 101 of the printer 1 checks whether or not the BD_ADDR of the host PC 2 that requested the device ID has been registered by the processing shown in the flowchart of FIG. 3 (S804). When the BD_ADDR address of the host PC 2 has not been registered, the CPU 101 determines whether or not the HCRP connection has been broken (S807), and when the HCRP connection has been broken, the process ends (S808).

When the BD_ADDR address of the host PC 2 has been registered, the CPU 101 monitors the status of the printer (the error status, the residual ink amount, the battery capacity and the like) (S805). When the status of the printer has changed, the status information after the change is transmitted to the host PC 2 on the data channel (S806). This processing is repeated during the HCRP connection (S807 and S808).

As described above, the printer 1 performs device ID response and status information transmission. In the above description, the device ID request is monitored by loop processing, however, the CPU may respond to the device ID request by interrupting processing from the protocol stack.

Next, the construction of the printer driver stored in the RAM 204 of the host PC 2 will be described. The printer driver is software in the host PC 2 which receives data from a general application and transmits print data to the printer 1. Further, the printer driver, including an application called "status monitor" to monitor the status of the printer 1, analyzes the status information data received from the printer 1 and displays the status of the printer 1 on the display device of the host PC 2. Further, the printer driver determines whether or not the host PC 2 is capable of HCRP two-way communication based on print port information of the host PC 2 and information on the installed protocol stack.

Next, the operation of the printer driver performed by the CPU 201 of the host PC 2 will be described in detail with reference to the flowchart of FIG. 9.

FIG. 9 is a flowchart showing the flow of processing by the status monitor application included in the printer driver. Note that for the sake of simplicity of explanation, the processing of the registration full flag is omitted from the flowchart.

The status monitor application included in the printer driver is started by the CPU 201 in accordance with the user's instruction (S901). When the status monitor is started, first, the status monitor checks whether or not HCRP two-way communication is possible based on the Bluetooth protocol stack installed in the host PC 2 (S902). When the HCRP two-way communication is impossible, as the status information cannot be received from the printer 1, the process ends without any processing (S913).

Further, when the HCRP two-way communication is possible, the printer driver controls the radio communication I/F control section 202, to perform processing upon Bluetooth connection with respect to the printer 1 (S903), then perform HCRP connection processing (S904). When the HCRP connection has been established, the printer driver requests a device ID from the printer 1 on the HCRP control channel, and obtains a device ID (S905). Next, the printer driver checks the registration completion flag in the obtained device ID, to determine whether or not the BD_ADDR address of the host PC 2 has already been registered in the printer 1 (S906). When the BD_ADDR address has not been registered, the printer driver transmits the "status information reception enable command" to the printer 1 (S907) to register the BD_ADDR address of the host PC 2 in the printer 1. When the BD_ADDR address has been registered, the printer driver receives the status information transmitted from the printer 1 thereafter (S908).

When the status has not changed on the printer 1 side, as the status information is not transmitted to the host PC 2, the host PC 2 side actually does not receive the status information. In this case, the printer driver determines that the status of the printer 1 has not changed. Further, when the status information has been received, the printer driver analyzes the information and displays the status of the printer 1 on the display device of the host PC 2 to notify the user of the status of the printer 1.

Thereafter, HCRP disconnect processing is performed (S909), then Bluetooth disconnect processing is performed (S910). When the user inputs a status monitor termination instruction, the printer driver terminates the operation of the status monitor (S913). Further, if no instruction has been inputted, the printer driver performs sleep processing for an arbitrary period (S912), and repeats the operation of the status monitor to monitor the printer 1.

Figure 10:
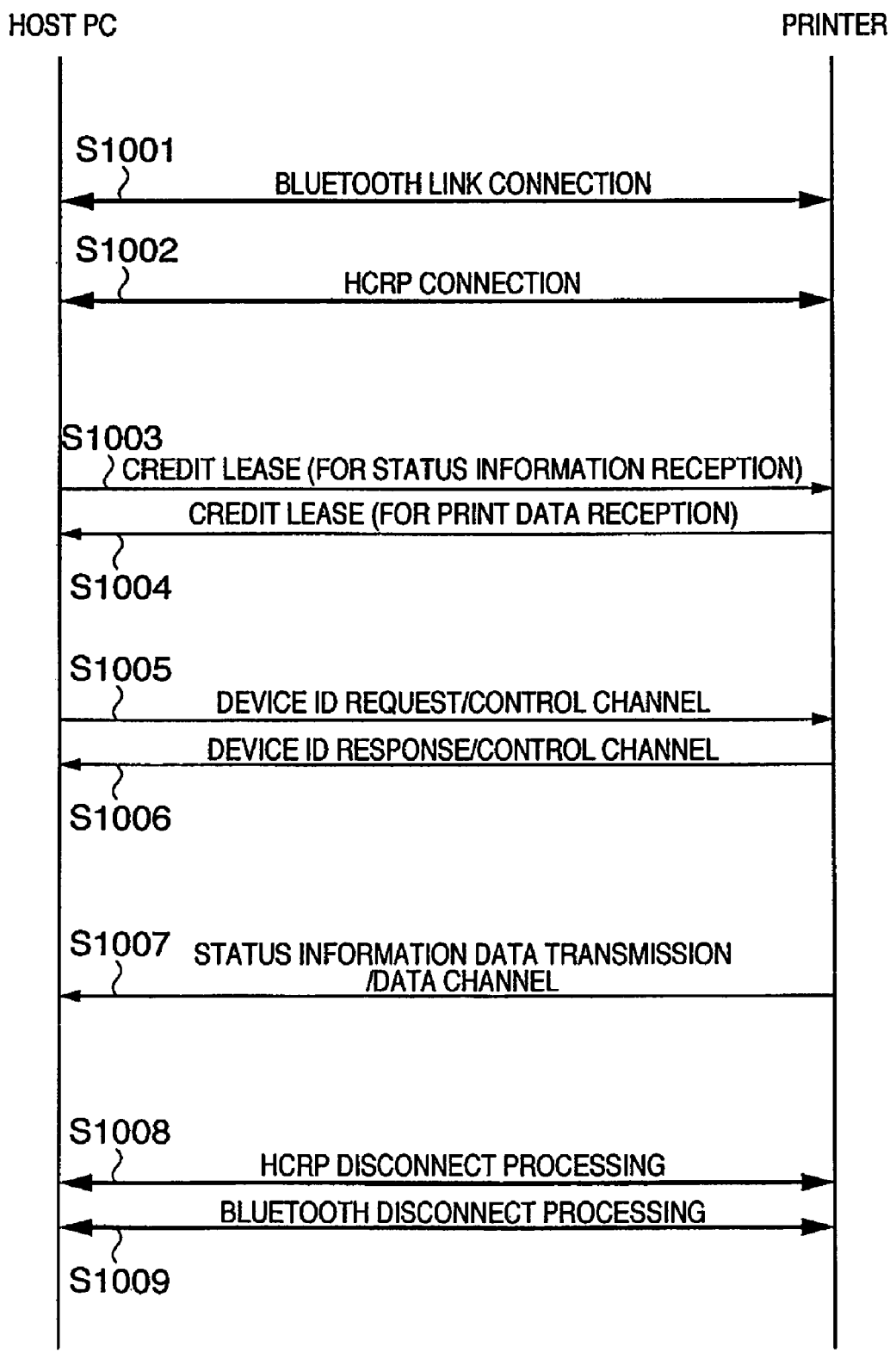
FIG. 10 illustrates a processing sequence of the status monitor application installed in the printer driver.

Next, the flow of communication between the printer 1 and the host PC 2 the BD_ADDR address of which has been registered will be described in detail with reference to the sequence diagram of FIG. 10. FIG. 10 shows the flow of processing when the status monitor application included in the printer driver operates.

When the status monitor application included in the printer driver is started on the host PC 2 in accordance with the user's instruction, the Bluetooth connection is established between the host PC 2 and the printer 1 on the initiative of the printer driver (S1001). Next, the HCRP connection is established (S1002), and credit exchange for HCRP two-way communication is performed. The host PC 2 presents a credit for status information reception to the printer 1 (S1003), and the printer 1 presents a credit for print data reception to the host PC 2 (S1004).

Next, the host PC 2 transmits a device ID request to the printer 1 on the control channel (S1005). Then, the printer 1 transmits the device ID where the registration completion flag indicating that the address of the host PC has been registered in the printer 1 is set (S1006). The host PC 2 checks that the host PC is registered in the printer 1 as a device capable of receiving the status information, and waits for the status information. As the address of the host PC 2 has been registered, the printer 1 transmits the status information of the printer 1 to the host PC 2 on the data channel (S1007).

On the other hand, when the printer driver on the host PC 2 receives the status information from the printer 1, the printer driver analyzes the information, and displays the status of the printer 1 on the display device of the host PC 2 to notify the user of the status of the printer 1. Thereafter, the HCRP disconnect processing is performed (S1008) and the Bluetooth disconnect processing is performed (S1009).

As described above, the device ID acquisition and the status information reception are performed between the host PC 2 and the printer 1.

As it is apparent from the embodiments described above, it is not necessary for the host PC to transmit the status information acquisition command to monitor the status of the printer upon each communication. In the first connection, the host PC transmits the status information reception enable command and registers its BD_ADDR address in the printer, thereby it obtains the status information. Accordingly, as in the case of USB connection, the status of the printer can be monitored by polling processing in accordance with a simple read operation.

Further, commonality of codes of the printer driver in the host PC can be achieved in the Bluetooth connection and the USB connection. Further, the inconvenience due to inadvertent transmission of status information from the printer to a host PC which cannot receive the status information can be prevented.

Further, in a printer having plural interfaces, in which the occupation of interface is changed in accordance with data communication from a host PC, as communication by the host PC to monitor the status of the printer does not occur on the data channel, it is not necessary to change the occupation of interface. In this case, the status information can be transmitted without disturbing communication by the other interface.

According to the second embodiment, a highly convenient system where processing with reduced redundancy can be performed between a host device and an image forming apparatus can be provided.

For example, it is not necessary for the host device to transmit the status information acquisition command at every connection to monitor the status of the image forming apparatus. Further, the inconvenience due to inadvertent transmission of status information from the printer to a host device which cannot receive the status information can be prevented.

Note that the respective processings shown in FIGS. 2 to 4 and FIGS. 6 to 9 are realized by reading the programs to realize the functions of the respective processings from the memory and executing the programs by the CPU.

Further, the present invention is not limited to the above-described arrangements, but all or a part of the functions of the respective processings shown in FIGS. 2 to 4 and FIGS. 6 to 9 may be realized by specialized hardware. Further, the memory described above may be a nonvolatile memory such as a HDD, a magneto-optical disk device, a flash memory, a read-only storage medium such as a CD-ROM, a volatile memory other than RAM, computer reading by using a combination of these media, or a writable recording medium.

Further, the respective processings shown in FIGS. 2 to 4 and FIGS. 6 to 9 may be performed by recording the programs to realize the functions of the respective processings in a computer-readable storage medium, then installing the programs into a computer system and executing the programs.

Note that the above "computer system" includes an OS and hardware such as peripheral devices. More particularly, the present invention also includes a case where, after a program read from the storage medium is written in a function expansion card which is inserted into the computer or in a memory provided in a function expansion unit which is connected to the computer, a CPU or the like contained in the function expansion card or unit performs a part or entire process in accordance with designations of the program and realizes functions of the above embodiments.

Further, the "computer-readable storage medium" means a portable medium such as a flexible disk, a magneto-optical disk, a ROM or a CD-ROM, or a storage device such as a hard disk included in the computer system. Further, the "computer-readable storage medium" includes a medium holding a program for a predetermined period such as a volatile memory (RAM) in a computer system which serves as a server or a client upon transmission of program via a network such as the Internet or communication line such as a telephone line.

Further, the program above may be transmitted from the computer system holding the program in the storage device or the like to another computer system via a transmission medium or transmission wave in the transmission medium. Note that the "transmission medium" means a medium having information transmission function including a network (communication network) such as the Internet and a communication line such as a telephone line.

Further, the above program may be employed to realize a part of the functions described above. Further, the program may be a so-called difference file (difference program) to realize the above-described functions with the combination of the program and a program already recorded in the computer system.

Further, a program product such as a computer-readable storage medium holding the above program can be employed as an embodiment of the present invention. The program above, the storage medium, the transmission medium, and the program product are included in the scope of the present invention.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application Nos. 2004-342250 filed on Nov. 26, 2004 and 2004-363377 filed on Dec. 15, 2004, which are hereby incorporated by reference herein.

What is claimed is:

1. A print system comprising a host device and a printer for transmitting print data from the host device to the printer by radio communication to perform printing,
wherein the host device comprises:
a first connection unit configured to connect to the printer based on a predetermined profile, wherein the profile includes designations of a control channel and a data channel;
an acquisition unit configured to acquire registration information indicating whether or not the host device has been registered in the printer from the printer connected by the first connection unit using the control channel designated by the predetermined profile;
a determination unit configured to determine whether or not two-way communication is possible for the host device using the data channel designated by the predetermined profile; and
a first notification unit configured to notify the printer of information indicating that the two-way communication is possible in accordance with the registration information acquired by the acquisition unit in a case where it is determined by the determination unit that the two-way communication is possible, and to receive status information of the printer from the printer using the data channel,
wherein the information indicating that the two-way communication is possible is not notified to the printer in a case where it is determined by the determination unit that the two-way communication via the data channel is impossible, and
wherein the printer comprises:
a second connection unit configured to connect to the host device based on the predetermined profile;
a registration unit configured to register identification information of the host device in a registration area and transmit the registration information indicating that the host device has been registered in the printer to the host device using the control channel in response to a request by the acquisition unit; and
a second notification unit configured to notify the host device of the status information of the printer using the data channel in a case where the information indicating that the two-way communication is possible is notified by the first notification unit,
wherein the registration unit transmits device ID information to the host device identified by the identification information registered by the registration unit,
wherein the device ID information identifies the printer and includes the registration information indicating that the identification information has been registered, and
wherein the device ID information includes information indicating that a maximum number of identification information of host devices has been registered in the printer.

2. A printing method for transmitting print data from a host device to a printer by radio communication to perform printing, the method comprising:
a first connection step by the host device, to connect to the printer based on a predetermined profile, wherein the profile includes designations of a control channel and a data channel;
an acquisition step by the host device, to acquire registration information indicating whether or not the host device has been registered in the printer from the printer connected in the first connection step using the control channel designated by the predetermined profile;
a determination step by the host device, to determine whether or not two-way communication is possible for the host device using the data channel designated by the predetermined profile;
a first notification step by the host device, to notify the printer of information indicating that two-way communication is possible in accordance with the registration information acquired in the acquisition step in a case where it is determined in the determination step that two-way communication is possible, and to receive status information of the printer from the printer using the data channel,
wherein the information indicating that the two-way communication is possible is not notified to the printer in a case where it is determined in the determination step that the two-way communication via the data channel is impossible;
a second connection step by the printer, to connect to the host device based on the predetermined profile;
a registration step by the printer, to register identification information of the host device in a registration area and transmit the registration information indicating that the host device has been registered in the printer to the host device using the control channel in response to a request in the acquisition step; and
a second notification step by the printer, to notify the host device of the status information of the printer using the data channel in a case where the information indicating that the two-way communication is possible is notified in the first notification step,
wherein in the registration step, device ID information is transmitted to the host device identified by the identification information registered in the registration step,
wherein the device ID information identifies the printer and includes the registration information indicating that the identification information has been registered, and
wherein the device ID information includes information indicating that a maximum number of identification information of host devices has been registered in the printer.

3. A host device for transmitting print data to a printer by radio communication, comprising:
a connection unit configured to connect to the printer based on a predetermined profile, wherein the profile includes designations of a control channel and a data channel;
an acquisition unit configured to acquire registration information indicating whether or not the host device has been registered in the printer from the printer connected by the connection unit using the control channel designated by the predetermined profile;
a determination unit configured to determine whether or not two-way communication is possible for the host device using the data channel designated by the predetermined profile; and
a notification unit configured to notify the printer of information indicating that the two-way communication is possible in accordance with the registration information acquired by the acquisition unit in a case where it is determined by the determination unit that two-way communication is possible, and to receive status information of the printer from the printer using the data channel,
wherein the information indicating that two-way communication is possible is not notified to the printer in a case where it is determined by the determination unit that the two-way communication via the data channel is impossible,
wherein the printer transmits device ID information to the host device identified by identification information registered in the printer,
wherein the device ID information identifies the printer and includes the registration information indicating that the identification information has been registered, and
wherein the device ID information includes information indicating that a maximum number of identification information of host devices has been registered in the printer.

4. An information processing method of a host device for transmitting print data to a printer by radio communication, the method comprising:
a connection step of connecting to the printer based on a predetermined profile, wherein the profile includes designations of a control channel and a data channel;
an acquisition step of acquiring registration information indicating whether or not the host device has been registered in the printer from the printer connected in the connection step using the control channel designated by the predetermined profile;
a determination step of determining whether or not two-way communication is possible for the host device using the data channel designated by the predetermined profile; and
a notification step of notifying the printer of information indicating that two-way communication is possible in accordance with the registration information acquired in the acquisition step in a case where it is determined in the determination step that two-way communication is possible, and to receive status information of the printer from the printer using the data channel,
wherein, in the notification step, the information indicating that two-way communication is possible is not notified to the printer in a case where it is determined in the determination step that the two-way communication via the data channel is impossible,
wherein the printer transmits device ID information to the host device identified by identification information registered in the printer,
wherein the device ID information identifies the printer and includes the registration information indicating that the identification information has been registered, and
wherein the device ID information includes information indicating that a maximum number of identification information of host devices has been registered in the printer.

5. A non-transitory computer readable storage medium having a computer program stored thereon, the computer program for causing a computer to execute an information processing method of a host device for transmitting print data to a printer by radio communication, the method comprising:
a connection step of connecting to the printer based on a predetermined profile, wherein the profile includes designations of a control channel and a data channel;
an acquisition step of acquiring registration information indicating whether or not the host device has been registered in the printer from the printer connected in the connection step using the control channel designated by the predetermined profile;
a determination step of determining whether or not two-way communication is possible for the host device using the data channel designated by the predetermined profile; and
a notification step of notifying the printer of information indicating that two-way communication is possible in accordance with the registration information acquired in the acquisition step in a case where it is determined in the determination step that two-way communication is possible, and to receive status information of the printer from the printer using the data channel,
wherein, in the notification step, the information indicating that two-way communication is possible is not notified to the printer in a case where it is determined in the determination step that the two-way communication via the data channel is impossible,
wherein the printer transmits device ID information to the host device identified by identification information registered in the printer,
wherein the device ID information identifies the printer and includes the registration information indicating that the identification information has been registered, and
wherein the device ID information includes information indicating that a maximum number of identification information of host devices has been registered in the printer.

* * * * *